United States Patent [19]

Osada

[11] Patent Number: 4,735,852
[45] Date of Patent: Apr. 5, 1988

[54] ELECTROCONDUCTIVE THIN FILM

[75] Inventor: Yoshihito Osada, Mito, Japan

[73] Assignee: Ricoh Co., Ltd., Tokyo, Japan

[21] Appl. No.: 893,412

[22] Filed: Aug. 5, 1986

[30] Foreign Application Priority Data

Aug. 23, 1985 [JP] Japan ................................. 60-186408

[51] Int. Cl.[4] .................... B32B 15/00; B32B 9/00; B05D 3/06
[52] U.S. Cl. ................................ 428/336; 428/432; 428/697; 428/469; 427/40; 427/41
[58] Field of Search .............. 428/336, 469, 432, 697; 427/40, 41, 86, 89

[56] References Cited

U.S. PATENT DOCUMENTS 4,402,996  9/1983  Gauger et al. .................. 427/86
4,532,188  7/1985  Naarman et al. ................ 427/86

Primary Examiner—P. C. Ives
Attorney, Agent, or Firm—Flynn, Thiel, Boutell & Tanis

[57] ABSTRACT

This invention relates to an electroconductive thin film prepared by forming a polymerized thin film on a substrate in a vacuum reactor by the decomposition of a metal complex starting material by glow discharge, said metal complex having a ligand selected from the group consisting of acetylacetonate and at least partially fluorinated acetylacetonate.

10 Claims, 2 Drawing Sheets

ELECTROCONDUCTIVE THIN FILM

BACKGROUND OF THE INVENTION (a) Field of the Invention

This invention relates to an electroconductive thin film, particularly a polymerized thin film formed on a desired substrate by decomposing a specific metal complex starting material by glow discharge.

(b) Description of the Prior Art

Heretofore, most of electroconductive materials have relied on inorganic materials, but recently, organic materials, i.e. organic electroconductive materials have been getting popular, and researches and developments for them have been extensively made.

Typical examples of the organic conductive materials reported up to now are listed in the following Table 1.

TABLE 1

| Polymer | Structure | Dopant | Electric Conductivity (s/cm) |
|---|---|---|---|
| polypyrrole | $(C_4H_3N)x$ | $BF_4$ | $10^2$ |
| poly(N—methyl pyrrole) | $(C_4H_2NCH_3)x$ | | |
| poly(N—phenyl pyrrole) | $(C_4H_2NC_6H_5)x$ | | |
| poly(N—benzyl pyrrole) | $(C_4H_2NCH_2C_6H_5)x$ | | |
| (pyrrole)(N—methyl pyrrole) copolymer | $(C_4H_3N)x(C_4H_2NCH_3)y$ | $BF_4$ | $5 \times 10^{-3} \sim 10^2$ |
| (N—methyl pyrrole)(N—phenyl pyrrole) copolymer | $(C_4H_2NCH_3)x(C_4H_2NC_6H_5)y$ | | |
| polyfuran | $(C_4H_2O)x$ | $BF_4$ | $10^{-5}$ |
| poly thienylene | $(C_4H_2S)x$ | $BF_4$ | $1.3 \times 10$ |
| poly(3-methyl-2,5-thienylene) | $(C_4HCH_3S)x$ | | |
| poly(2,4-thienylene) | $(2,4-C_4H_2S)x$ | iodine | $7 \times 10^{-11}$ |
| (2,5-thienylene)(2,4-thienylene) copolymer | $(2,5-C_4H_2S)x(2,4-C_4H_2S)y$ $[x/(x + y) = 0.87]$ | iodine | $10^{-4}$ |
| poly(2,5-selenophene) | $(2,5-C_4H_2Se)x[x = 6\sim12]$ | | |
| poly(p-phenylene) | $(p-C_6H_4)x$ | $AsF_5$ | $5 \times 10^2$ |
| poly(m-phenylene) | $(m-C_6H_4)x$ | $AsF_5$ | $10^{-3}$ |
| poly(m-phenylene isophthalamide) | $[m-C_6H_2(CONH_2)_2]x$ | TCNE | $5 \times 10^{-13}$ |
| poly(1,4-naphthylene) | $(1,4-C_{10}H_6)x$ | $SbF_5$ | $1.1 \times 10^{-4}$ |
| poly(1,5-naphthylene) | $(1,5-C_{10}H_6)x$ | $SbF_5$ | $1.5 \times 10^{-5}$ |
| poly(2,6-naphthylene) | $(2,6-C_{10}H_6)x$ | $SbF_5$ | $1.8 \times 10^{-1}$ |
| poly(2,7-naphthylene) | $(2,7-C_{10}H_6)x$ | $SbF_5$ | $1.7 \times 10^{-3}$ |
| hetero polyphenylene | $(Z—C_{10}H_6—C_6H_4—C_{10}H_6)x$ $[z = O, x = 10]$ | $AsF_5$ | $5 \times 10^{-2}$ |
| | $(C_6H_4ON—C_6H_4ON—C_6H_4)x$ | $AsF_5$ | $5 \times 10^{-3}$ |
| poly(p-phenylene oxide) | $(C_6H_4O)x$ | $AsF_5$ | $1.4 \times 10^{-4}$ |
| poly(diphenylene oxide) | $(C_6H_4C_6H_4O)x$ | $AsF_5$ | $1.1 \times 10^{-5}$ |
| poly acetylene | $(CH=CH)x$ | $AsF_5$ | $1.2 \times 10^3$ |

Among the above listed high molecular electroconductive materials, polymers such as polyacetylene, poly(p-phenylene), polypyrrole, polythienylene, polythiazole (SN)x, polyphthalocyanine and the like are considered to have relatively high electroconductivity and rectification properties. However, none of these materials are satisfactory in view of switching function and memory function.

A plasma-polymerized polystyrene (polymerized by glow discharge decomposition method) and the like have been reported to have good switching function and memory function (Journal of Applied Physics, Vol. 46, No. 8, August, 1975, U.S.A.). However, these polystyrene and the like have a disadvantage of being liable to cause dielectric breakdown. Poly-N-vinyl carbazole thin film has been reported in the same manner as above, but this has a disadvantage in that the time required for switching is too long, that is, it takes about several tenths of a second to several ten seconds (Journal of Chemical Society, Faraday Trans. 2, 72, 1911 (1976), U.S.A.).

As mentioned above, heretofore, there have been no organic type electroconductive high molecular thin films having both satisfactory switching and memory functions.

SUMMARY OF THE INVENTION

An object of the present invention is to provide a novel organic metal type electroconductive thin film having satisfactory high switching and memory functions.

That is, an object of the present invention is to provide an electroconductive thin film prepared by forming a polymerized thin film on a substrate in a vacuum reactor by the decomposition of a metal complex starting material by glow discharge, said metal complex having a ligand selected from the group consisting of acetylacetonate and at least partially fluorinated acetylacetonate.

DETAILED DESCRIPTION OF THE INVENTION

Figure 1:
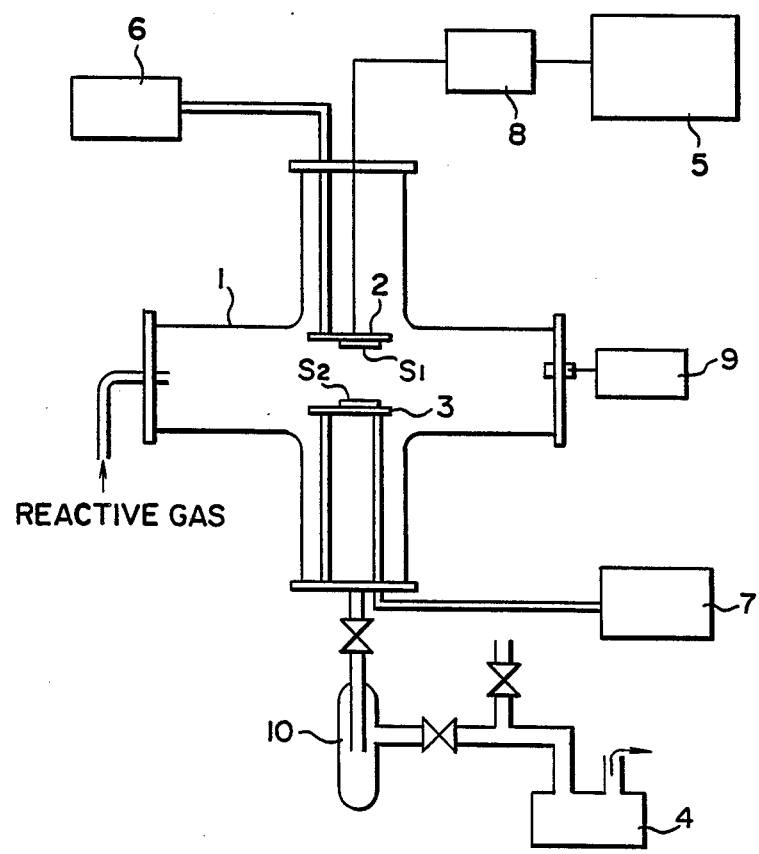
FIG. 1 illustrates an outline of an apparatus suitable for preparing an electroconductive thin film of the present invention.

The electroconductive thin film of the present invention is characterized by being prepared by forming a polymerized thin film on a desired substrate placed in a vacuum reactor by the decomposition of a metal complex starting material by glow discharge, said metal complex having a ligand selected from the group consisting of acetylacetonate and at least partially fluorinated acetylacetonate.

The center metal of the metal complex should preferably be selected from the group consisting of the first transition elements (Atomic Number 21 to 29) of the Periodic Table, for example, Sc, Ti, V, Cr, Mn, Fe, Co, Ni, Cu and Zn.

The present invention is based on the discovery that a film (plasma-polymerized film) formed on a substrate by decomposing a specific metal complex starting material by glow discharge decomposition method has satisfactory switching function and memory function.

The metal complex (monomer) used as a starting material for forming an electroconductive thin film by glow discharge decomposition method is expressed by the following structural formula,

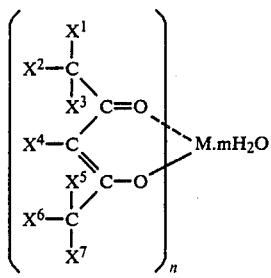

wherein $X^1$ to $X^7$ are respectively —H or —F; n being an integer of 1 to 4; m being an integer of 0 to 5; and M being the center metal.

M in the above formula is the center metal and is selected from the group consisting of the first transition elements (Sc, Ti, V, Cr, Mn, Fe, Co, Ni, Cu and Zn) as mentioned above.

Suitable examples of a film-forming method include direct current glow discharge decomposition method, alternating current glow discharge decomposition method and the like, but the most suitable method is the radio frequency (RF) glow discharge decomposition method. The glow discharge decomposition method is a well known art.

An example of the film forming conditions by RF glow discharge decomposition method is illustrated below. The heat evaporation temperature of a solid monomer is preferably maintained at such a temperature as that of the vapor pressure of the starting material (metal complex monomer) becomes $10^{-2}$ torr to 100 torr. The figures in the parenthesis represent a preferable range.

Radio Frequency Number: 50 KHz~2.45 GHz (100 KHz~50 MHz)
Radio Frequency Power: 1~500 W (5~200 W)
Reaction Pressure: 0.01~10 torr (0.05~2.0 torr)
Substrate Temperature: $-50°$ C.~$300°$ C. ($0°$ C.~$200°$ C.)

According to the glow discharge decomposition method, the film forming step can be carried out by being allowed to stand, or by maintaining the temperature constant, or by stepwise varying the temperature, provided that the substrate temperature is within the above mentioned range.

Various materials such as various metals, glasses, high molecular films, ceramics, inorganic single crystals and the like can be used as a substrate material, but should not be limited thereto.

If necessary, other reactive materials, carrier gases, impurities and the like may be present during the reaction.

In such a manner as mentioned above, a plasma polymerized film is formed on a desired substrate. The thickness of the film thus formed is generally 50 Å~5 μm, preferably 100 Å~2 μm.

The electroconductive thin film of the present invention (thickness: 50 Å~5 μm) has a conductivity of $10^{-13}$~$10^3$ S/cm at room temperature, and has an infrared absorption spectrum by infrared absorption spectrum analysis on the following matters,

As proved by the following Examples, the electroconductive thin film thus formed has satisfactory switching and memory functions.

The present invention is further illustrated by the following Examples, but should not be limited thereto.

EXAMPLE 1

An electroconductive thin film was prepared using a capacitive coupling type plasma-polymerization apparatus in accordance with the following steps (i) to (iv).

(i) Indium tin oxide (ITO) was vapor-deposited on a glass plate of 2 cm×3 cm having a thickness of 1.1 mm, the surface of which had been cleaned. Two of the ITO-deposited glass plates thus prepared were used as transparent electrode substrates $S_1$ and $S_2$. These electrodes $S_1$ and $S_2$ were fixed, together with KBr disk for IR measurement, on the predetermined parts (the upper and the lower RF electrodes 2 and 3) of a plasma reactor 1.

(ii) A solid crystal monomer of acetylacetonatocopper (II) was placed as a starting material on an appropriate part of the lower electrode 3.

(iii) The plasma reactor 1 was evacuated to 0.1 torr by a vacuum pump 4 while controlling by a vacuum meter 9. Keeping this vacuum state as it is, high frequency discharge of 13.56 MHz and 100 W power was applied on the RF electrode 2 for two hours by switching RF electric source 5 provided with a matching box 8. During this discharge, the temperature of the substrates $S_1$ and $S_2$ was raised from room temperature to 80° C. while controlling the substrate temperature by temperature controllers 6 and 7.

(iv) The reactor 1 was evacuated by completely opening evacuation valves (not shown), and $N_2$ gas was then introduced into the reactor to atmospheric pressure. The substrate having a plasma-polymerized film formed thereon was then taken out from the reactor.

The film thus obtained was transparent light brown, and has a thickness of about 8,000 Å. The electric conductivity of this film measured by the four-point probe method was $10^{-3}$ to $10^{-5}$ S/cm at room temperature, and this film had an infrared absorption spectrum by infrared absorption spectrum analysis on the following matters,

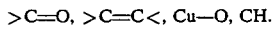

A device of Al/P-P-Cu(AcAc)$_2$/ITO element was prepared by vapor-depositing Al on the above plasma-polymerized film to a thickness of about 150 Å. Said P-P-Cu(AcAc)$_2$ represents plasma-polymerized acetylacetonatocopper.

Figure 2:
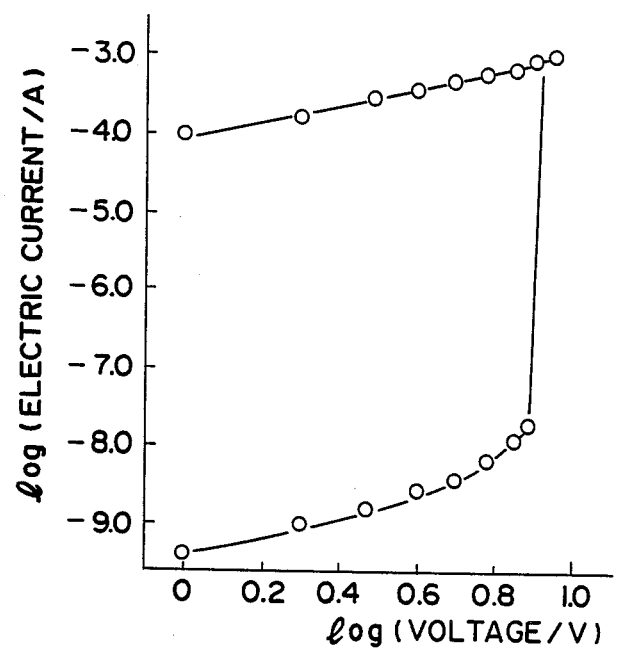
FIG. 2 is a graph showing the switching properties of an Al/P-P-Cu(AcAc)$_2$/ITO element (wherein Al represents aluminum; P-P-Cu(AcAc)$_2$ representing plasma polymerized acetylacetonatocopper; and ITO representing indium tin oxide).

Voltage-electric current properties of the element thus obtained were investigated, and it was proved that this element has a satisfactory switching function as expressed by the following FIG. 2. That is, during the increasing of the applied voltage from 0 volt to 7.9 volts, only an extremely small amount of electric current in the order of nA (nano-ampere) flowed (substantially switching OFF state). However, when the applied voltage exceeds 7.9 volts, the value of the electric current suddenly varied and an electric current in the order of mA (milli-ampere) flowed (switching ON state). This electric current value is $4 \times 10^4$ times as large as the electric current flowing under the voltage of 0 volt to 7.9 volts.

On the contrary, the voltage was reduced to bias voltage of 0 volt, but this switching ON state was maintained and about 0.2 μA of electric current flowed. This means that this element has a memory function also.

Figure 3:
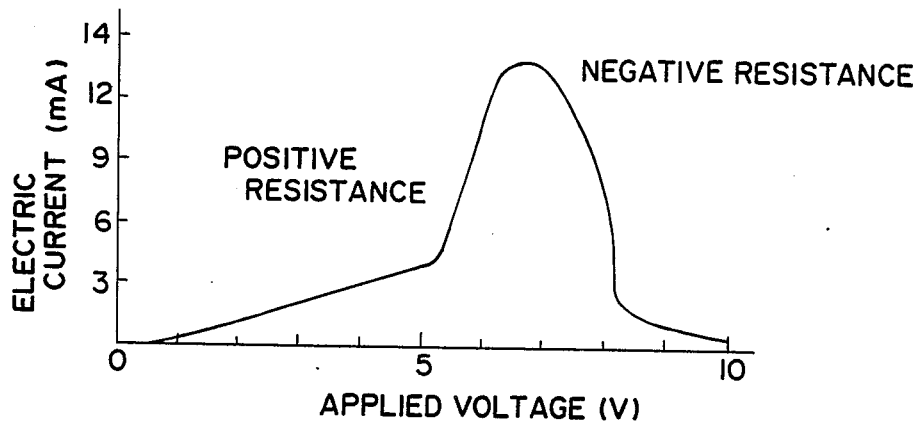
FIG. 3 is a graph showing that a negative resistance appears on an Al/P-P-Cu(AcAc)$_2$/ITO element when a certain constant voltage is applied.

Furthermore, the negative resistance properties of Al/P-P-Cu(AcAc)$_2$/ITO element were evaluated, and it was proved that this element has voltage-control type negative resistance properties. That is, as can be seen from FIG. 3, a positive resistance appears in the range of the increase of the applied voltage from 0 to 6.5 volts and a negative resistance appears in the range of the increase of the applied voltage from 6.5 to 10 volts.

These electrical properties of P-P-Cu(AcAc)$_2$ were recognized to be present also in the other plasma polymerized acetylacetonatometal films containing Fe, Co, or the like.

EXAMPLE 2

An electroconductive thin film was prepared in the same manner as in Example 1, except that

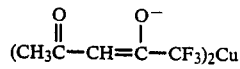

was used as a starting material. The electroconductive thin film thus obtained had almost the same electrical properties as those of the film prepared in Example 1.

As mentioned above, a novel organic high molecular electroconductive thin film of the present invention can easily be prepared from a metal complex by the plasma polymerization method. The electroconductive thin film of the present invention has both satisfactory switching and memory functions, and also has negative resistance properties. Therefore, the electroconductive thin film of the present invention is a very useful material for preparing a switching element, memory element, high frequency radiator element and the like.

What we claim is:

1. In an electroconductive thin film and substrate combination, the improvement comprising; said electroconductive thin film and substrate combination being prepared by forming a polymerized film on said substrate in a vacuum reactor by the decomposition of a metal complex starting material by glow discharge, said metal complex having a ligand selected from the group consisting of acetylacetonate and at least partially fluorinated acetylacetonate.

2. The electroconductive thin film combination as claimed in claim 1, wherein the center metal of said metal complex is at least one selected from the group consisting of Sc, Ti, V, Cr, Mn, Fe, Co, Ni, Cu and Zn.

3. The electroconductive thin film combination as claimed in claim 1, wherein the center metal of said metal complex is Cu.

4. The electroconductive thin film and substrate combination as claimed in claim 3, wherein said substrate comprises glass with an indium tin oxide coating.

5. The substrate and electroconductive thin film combination as claimed in claim 1, wherein said metal complex has the following general formula,

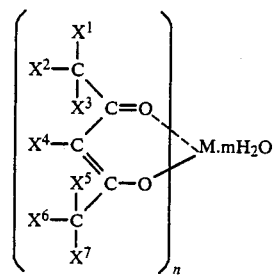

wherein $X^1$ to $X^7$ are respectively —H or —F; n being an integer of 1 to 4; m being an integer of 0 to 5; and M being the center metal.

6. The electroconductive thin film and substrate combination as claimed in claim 1, wherein said thin film has a thickness of 50 Å to 5 μm.

7. A substrate coated with an electroconductive thin plasma-polymerized film which film has high switching and memory functions and has a thickness of from 50 Angstrom units to 5 macrometers, said film having been formed on said substrate by placing in a vacuum reactor (1) said substrate and (2) a metal complex having the formula

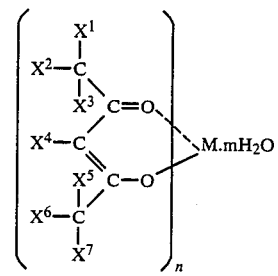

wherein $X^1$ to $X^7$, which can be the same or different, are H or F; n is an integer of 1 to 4; m is an integer of 0 to 5; and M is selected from the group consisting of Sc, Ti, V, Cr, Mn, Fe, Co, Ni, Cu and Zn, and subjecting said complex to glow discharge decomposition conditions effective to form said film on said substrate by plasma polymerization.

8. A coated substrate as claimed in claim 7 in which each of $X^1$ to $X^7$ is H.

9. A coated substrate as claimed in claim 8 in which some of $X^1$ to $X^7$ are F, and the remainder of $X^1$ to $X^7$ are H.

10. A coated substrate as claimed in claim 7 in which M is Cu and said film exhibits the presence of >C=O, >C=C<, Cu—O and CH, by infrared absorption spectrum analysis.

* * * * *